Oct. 14, 1941.   G. D. MALLORY   2,259,347
LAMINATING FILM
Filed May 10, 1940
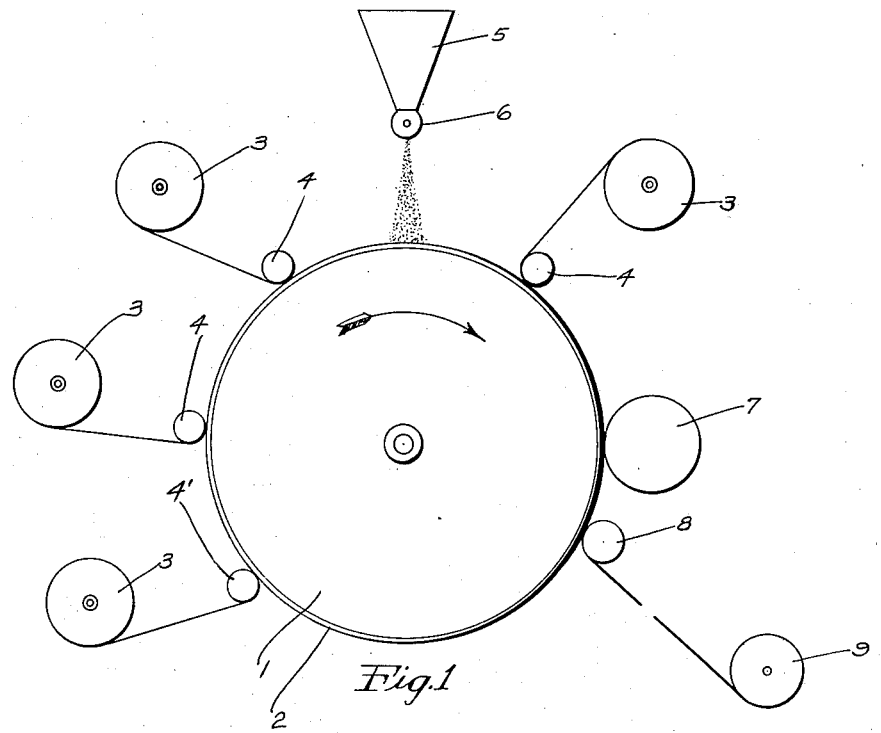
Fig.1
  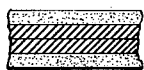
Fig.2        Fig.5
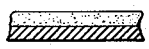  
Fig.3        Fig.6
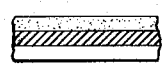  
Fig.4        Fig.7
☐ Unstretched Rubber Hydrochloride Film
▨ Rubber Hydrochloride Stretched Widthwise
▭ Rubber Hydrochloride Stretched Lengthwise
Key
Inventor
Gerald D. Mallory
By
Attorney Patented Oct. 14, 1941

2,259,347

UNITED STATES PATENT OFFICE 2,259,347

LAMINATING FILM

Gerald D. Mallory, Akron, Ohio, assignor to Wingfoot Corporation, Wilmington, Del., a corporation of Delaware Application May 10, 1940, Serial No. 334,373

2 Claims. (Cl. 154—2)

This invention relates to the lamination of heat-sealable, thermo-stretchable film. By "thermo-stretchable" is meant the ability to stretch when heated. The invention relates particularly to the lamination of stretched film to unstretched film or the lamination of film stretched on one axis to film stretched on another axis and includes various such laminated products.

According to this invention the various plies of film are spread out in succession on a large drum preferably a rubber-covered drum. They are separately laid flat on the drum and care is taken to see that all wrinkles are removed. Each of the separate plies is laid down with a roll which presses the ply to any ply or plies which have already been spread on the drum and thus removes air which may be trapped between the plies. After all of the plies have thus been spread flat on the surface of the drum, heat and pressure are applied to cause the plies to coalesce to one another. Although the invention will be described more particularly as applied to the lamination of films of rubber hydrochloride, it includes the lamination of other films such as films of vinyl polymerization products, etc.

The plies may be of any desired thickness. The unstretched plies will normally be of the order of .001 inch thick, for example .0005 to .0015 or .002 inch thick. The stretched plies may be considerably thinner. The plies may be stretched to two or three, or five or more times their original length. These stretched plies have different properties from the unstretched plies and by laminating plies having different properties, one obtains a laminated sheet having characteristics not present in the unstretched film or in the stretched unlaminated film.

Apparatus for effecting the lamination is shown in the accompanying drawing which also illustrates different types of laminated products that may be produced according to the invention. In the drawing, Fig. 1 is a diagrammatic showing of apparatus which may be employed. Figs. 2 to 7 are cross sections of ribbons of products which may be produced.

In the drawing the lamination is accomplished by building up various plies of film on the drum 1 which is covered with the layer of rubber 2. The rolls 3 are made up of different kinds of film. These films are separately brought to the drum 1 in a perfectly flat condition free from wrinkles. The usual means for removing wrinkles from each ply of the film may be employed as by smoothing it out manually, and the attendant must use care to see that each ply is laid on to the drum in a perfectly flat condition free from wrinkles. The pressure rolls 4 remove any trapped air from between the plies. The pressure roll 4' holds the first ply flat on the drum. Decorative material such as pigment, etc. may be spread over the whole width of any one or more of the sheets or over just a narrow area. The feed box 5 is equipped with the dispensing roll 6 for this purpose. This introduction of non-film material is not essential to the invention and where it is desired, it may be introduced between any two or more of the plies.

After the desired thickness of film has been built up on the drum, the various plies are united preferably while the material is still on the drum as by applying heat and pressure from one or more heated rolls 7. The plies will be heated to a temperature at which they will coalesce when the pressure of the roll 7 is applied to them. Instead of uniting the plies by pressure on to the rubber-covered drum the plies may be drawn partially around the heated roll 7 and pressed together by pressure from another heated roll (not shown). After laminating, the plies are taken from the drum around the roll 8 to cool. The product is then rolled up at the wind-up 9. Sufficient space is provided between the rolls 8 and 9 to allow the film to cool. Positive cooling means may be employed.

The various plies may be several inches wide or wider, up to a yard or more. They may be different colors and may be composed of plasticized and unplasticized film or all plies may be plasticized or unplasticized. Figs. 2 to 7 show various combinations of film. These are only illustrative as all possible combinations are intended to be covered and the particular laminations shown in the drawing are merely illustrative. Fig. 2, for example, shows the lamination of three different types of film. The drawing illustrates a narrow ribbon with the width of the film greatly exaggerated for the purpose of illustration. The films, of course, may be of any width. By stretching one ply longitudinally such as the top ply of Fig. 2 and another ply widthwise as the bottom ply of Fig. 2, and laminating these to the top and bottom respectively of a ply of non-stretched film, one obtains a film having unique properties as illustrated in Fig. 2. Fig. 3 shows a ply of film stretched lengthwise laminated to a ply stretched widthwise. Fig. 4 shows a ply stretched widthwise sandwiched between two plies stretched lengthwise. Fig. 5 shows two plies stretched widthwise sandwiched between two plies stretched lengthwise. Fig. 6 shows a ply stretched lengthwise sandwiched between two plies stretched widthwise. Fig. 7 shows two plies stretched lengthwise sandwiched between two plies stretched widthwise. All possible combinations are intended to be included, the illustrations being given for the purpose of example only. Two, three, four, five or more plies may be thus united.

Assuming the films of Figs. 2 to 7 to be rubber hydrochloride film, the unstretched ply of Fig. 1 will be a cast film about .001 of an inch thick prepared as described in Calvert U. S. Patent No. 1,989,632. The stretched plies may be plies which are stretched, for example, to four times their original length or width. Such stretching increases the tensile strength of the film and it also increases the tear resistance of the film in the direction perpendicular to the direction in which the film has been stretched. Stretching also affects other properties of the film. By laminating film stretched in both directions to unstretched film as shown in Fig. 2, a product is obtained which has high tensile strength and high tear resistance in both directions. The summation of the properties of such a laminated sheet is different from that of any other of the products here shown as well as being different from ordinary cast film in which the same thickness will not have the tear resistance and tensile strength of the film produced by lamination as shown in Fig. 1. Similarly, the other products will have unique properties.

Although the invention has been described more particularly as applied to the lamination of rubber hydrochloride film, it includes other films in which plies obtained by heating and stretching are thermally united to other plies which may be unstretched or unstretched.

I claim:

1. The process of uniting a plurality of plies of heat-sealable and thermo-stretchable material which comprises continuously and successively spreading the plies free from wrinkles on a large drum and pressing the air out between the successive plies as they are lead on the drum without uniting them and thereafter heating the plies and pressing them together so as to unite them while they are still in a flat condition free from entrapped air.

2. The method of uniting a stretched ply of rubber hydrochloride film to at least one other ply of rubber hydrochloride film which comprises continuously and successively spreading each ply free from wrinkles on the surface of a large drum without uniting the plies and pressing them together to remove entrapped air from between the plies as each successive ply is laid up on the drum and then heating the plies and uniting them with pressure before removing them from the drum.

GERALD D. MALLORY.